Nov. 20, 1962

E. R. BURDEN 3,064,716

ROTARY MOUNTER

Filed July 7, 1958

INVENTOR
Edward R. Burden

BY Cecil L. Wood

ATTORNEY

INVENTOR
Edward R. Burden

BY Cecil L. Wood

ATTORNEY

Nov. 20, 1962 E. R. BURDEN 3,064,716
ROTARY MOUNTER
Filed July 7, 1958 6 Sheets-Sheet 5

INVENTOR
Edward R. Burden
BY
ATTORNEY

Nov. 20, 1962 E. R. BURDEN 3,064,716
ROTARY MOUNTER
Filed July 7, 1958

INVENTOR
Edward R. Burden

BY Cecil L. Wood
ATTORNEY

United States Patent Office

3,064,716
Patented Nov. 20, 1962

3,064,716
ROTARY MOUNTER
Edward Rufus Burden, 1213 Hord St., Dallas, Tex.
Filed July 7, 1958, Ser. No. 747,020
15 Claims. (Cl. 156—567)

This invention relates to a rotary mounter, and it concerns more particularly a rotary machine for bonding one sheet of paper material to another to form a composite laminated sheet.

The principal object of the invention is to provide a machine for use in bonding a surface sheet of paper, which may be of good quality and may be printed or lithographed, as desired, to a base sheet of cardboard to form a composite laminated sheet having an attractive surface appearance, while at the same time being characterized by its stiffness, for use in making paper boxes.

Another object of the invention is to provide a machine for bonding a preformed surface sheet of paper, of predetermined size, to a preformed base sheet of cardboard having the same dimensions as the surface sheet, to form a composite laminated sheet in which the corresponding edges of the juxtaposed sheets are aligned with each other.

The invention contemplates a machine for the purpose described comprising a frame, a horizontally disposed cylinder rotatably supported on the frame, drive means for rotating the cylinder, paper-feed means adapted to support a sheet of paper while advancing it tangentially in close proximity to the cylinder, paper-gripping means on the circumference of the cylinder, means responsive to the rotative position of the cylinder automatically engaging the paper-gripping means with the leading edge of the paper whereby the paper is rotated with the cylinder, a glue feed roller adapted to apply a film of glue to one side of the paper as it is rotated, cardboard-feed means adapted to support a sheet of cardboard while advancing it tangentially in close proximity to the cylinder, cardboard gripping means carried by the cylinder, means responsive to the rotative position of the cylinder automatically engaging the cardboard-gripping means with the leading edge of the cardboard whereby the cardboard is rotated with the cylinder in juxtaposed relation to the paper, a pressure roller coacting with the cylinder to press the juxtaposed sheets together, and means responsive to the rotative position of the cylinder automatically releasing the paper and cardboard-gripping means, respectively, as the composite sheet is advanced beyond the pressure roller.

The invention further contemplates, in the structure described, means responsive to the rotative position of the cylinder for raising the pressure roller, and disengaging it from the cylinder, for a time interval sufficient to permit free operation of the cardboard-gripping means, whereby the cardboard-gripping means engages the leading edge of the cardboard sheet, and to permit the paper and cardboard-gripping means, and the leading edges of the juxtaposed sheets, to be passed below the pressure roller.

The invention further contemplates, in the structure described, means responsive to the rotative position of the cylinder restraining the cardboard sheet against advancement relative to the cylinder until the leading edge of the paper sheet is aligned with the leading edge of the cardboard sheet, by rotation of the paper sheet with the cylinder, and thereafter releasing the cardboard sheet instantaneously, whereby the cardboard sheet is rotated with the cylinder, in juxtaposed relation to the paper sheet, in response to the action of the cardboard-gripping means.

The invention will be readily understood by referring to the following description and the accompanying drawing, in which.

Referring to the drawing, the rotary mounter of the invention includes a frame, designated generally by the numeral 1. The frame 1 has front and rear sides, shown in FIGURES 1 and 2, respectively, which are substantially identical. The front and rear sides of the frame 1 each consist of a pair of standards 2, an elongated, horizontally disposed side brace 3 connecting the standards 2 intermediate their ends, and an elongated, horizontally disposed side brace 4 connecting the standards 2 adjacent their bases. The sides of the frame 1 are connected by end braces 5 and 6 corresponding to the side braces 3 and 4, respectively.

A horizontally disposed cylinder 7 is rotatably supported on the frame 1 as hereinafter described. The cylinder 7 has a circumferential area substantially larger than the sheets of paper and cardboard which are to be bonded together.

Figures 1, 6:
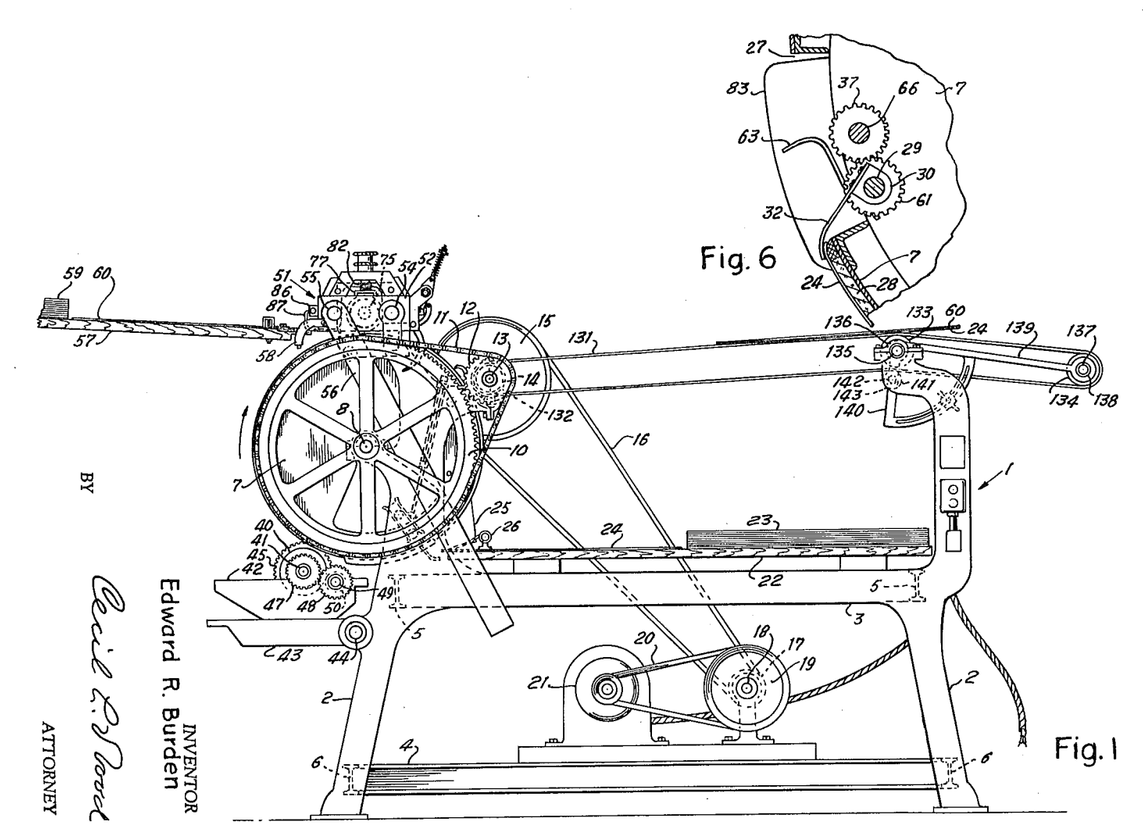
FIGURE 1 is a front elevational view of a rotary mounter embodying the invention.
FIGURE 6 is a fragmentary sectional elevational view, on an enlarged scale, showing the paper gripper in its engaged position and showing the cardboard gripper disengaged.
Figures 2, 7:
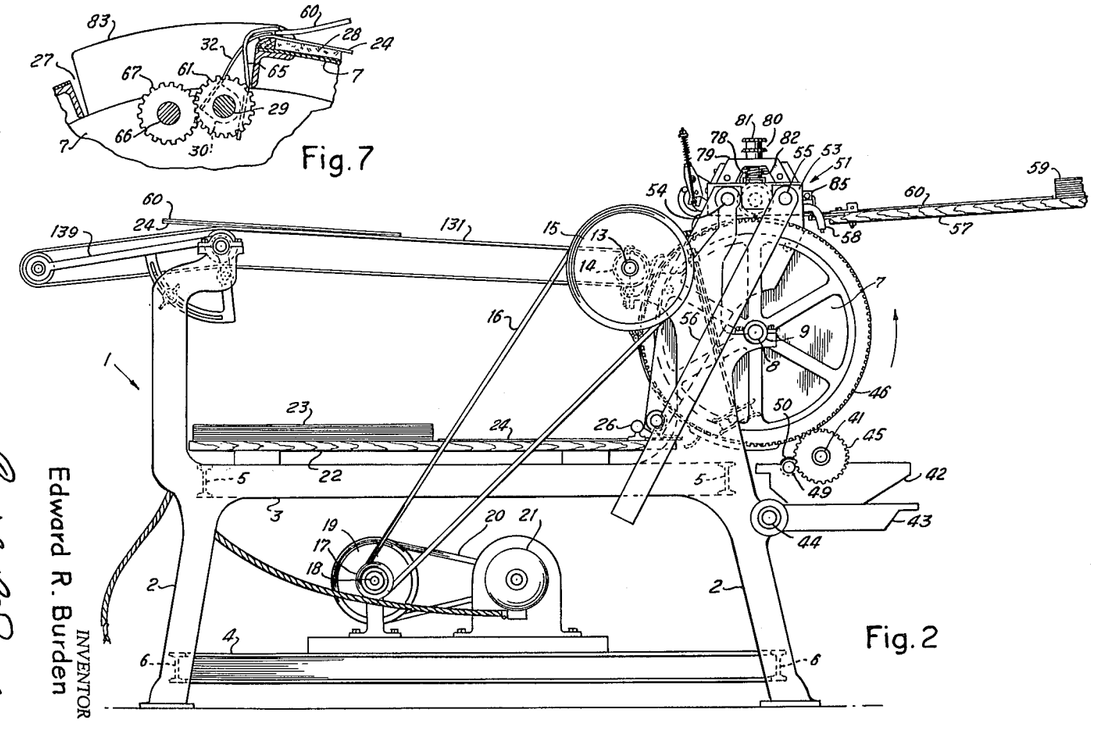
FIGURE 2 is a rear elevational view.
FIGURE 7 is a view similar to FIGURE 6, showing both the paper gripper and the cardboard gripper in their engaged positions.
Figure 3:
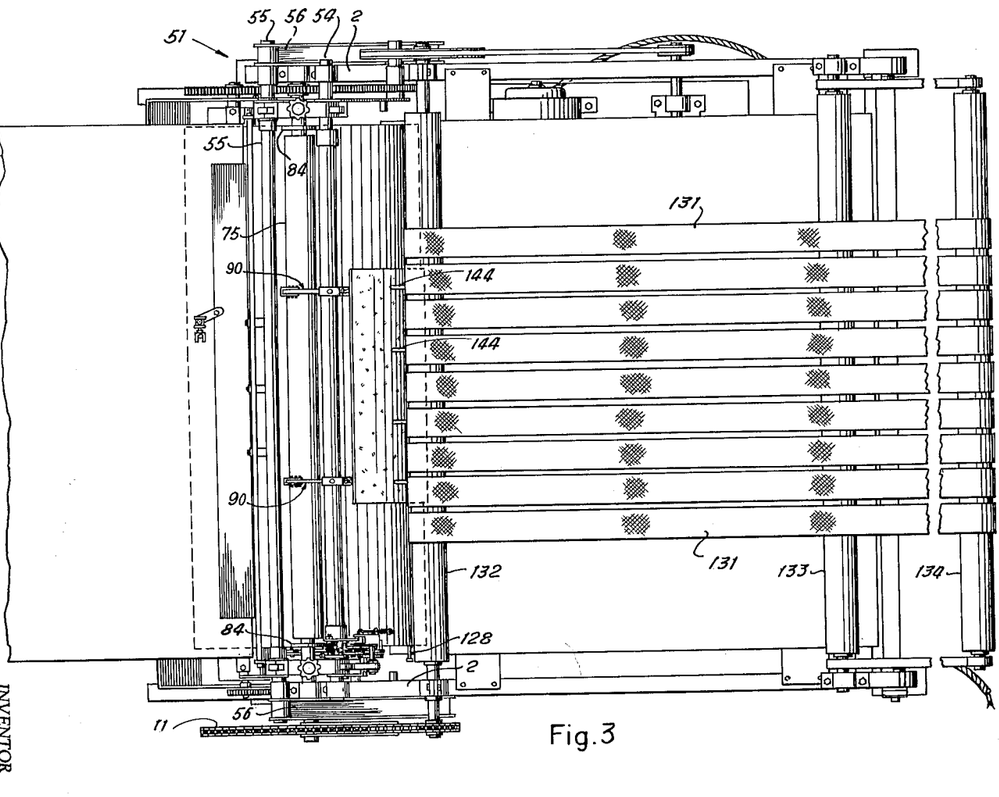
FIGURE 3 is a top plan view.
Figure 4A:
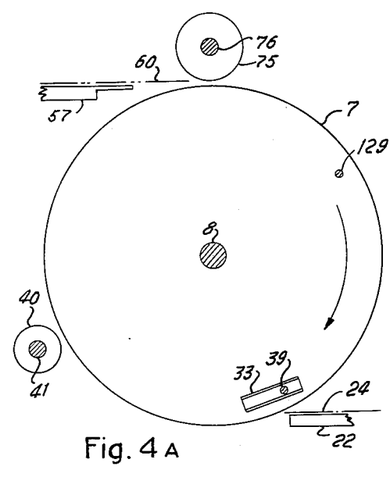
FIGURE 4A is a diagrammatic elevational view showing the rotative position of the cylinder relative to the paper-gripper actuating pins when the paper is picked up by the cylinder.
Figure 4B:
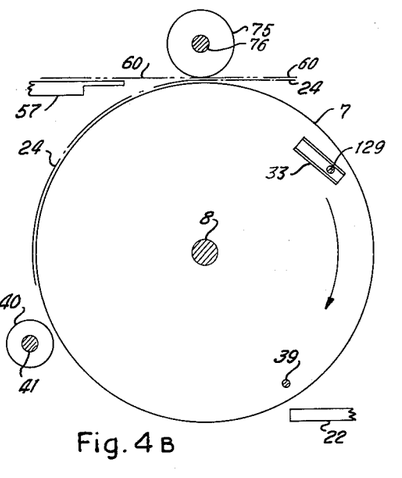
FIGURE 4B is a diagrammatic elevational view showing the rotative position of the cylinder relative to the paper-gripper actuating pins when the laminated sheet is released by the cylinder.
Figure 5A:
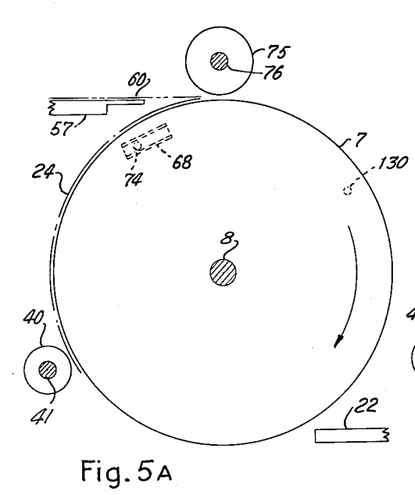
FIGURE 5A is a diagrammatic elevational view showing the rotative position of the cylinder relative to the cardboard-gripper actuating pins when the cardboard is picked up by the cylinder.
Figure 5B:
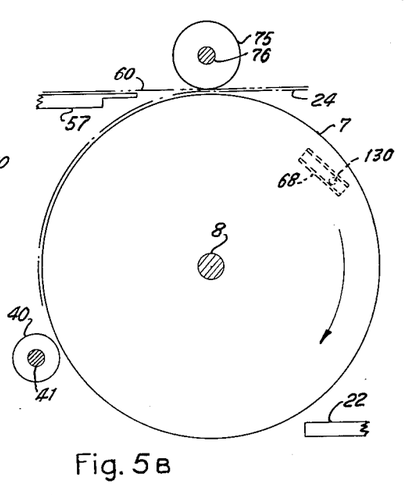
FIGURE 5B is a diagrammatic elevational view showing the rotative position of the cylinder relative to the cardboard-gripper actuating pins when the laminated sheet is released by the cylinder.
Figure 8:
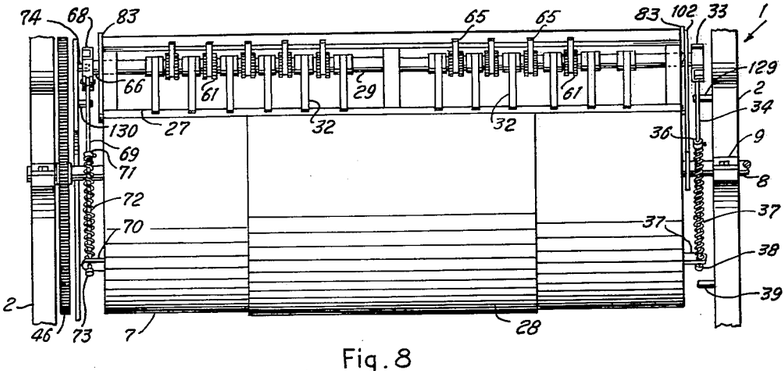
FIGURE 8 is a fragmentary elevational view showing the front of the cylinder, and showing the paper gripper in its engaged position and the cardboard gripper disengaged.
Figure 9:
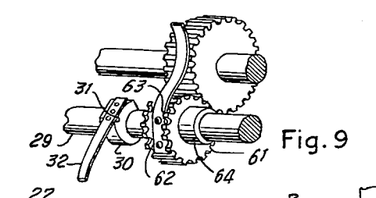
FIGURE 9 is a fragmentary perspective view, on an enlarged scale, showing one each of the individual gripping units comprising the paper and cardboard grippers, respectively.
Figure 10:
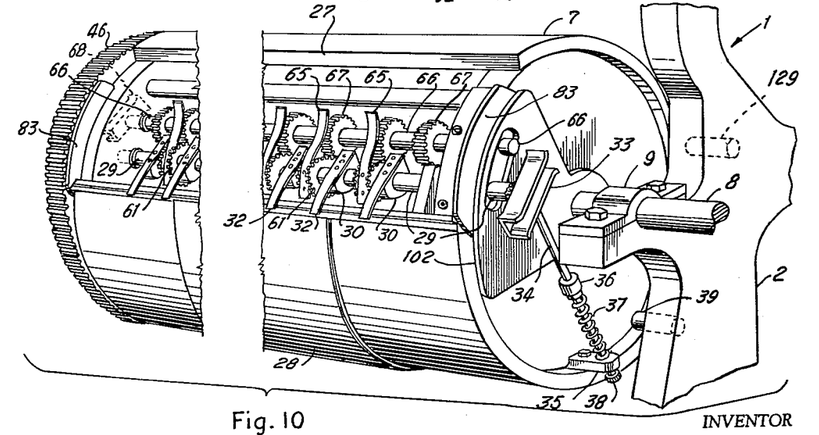
FIGURE 10 is a fragmentary perspective view showing the top, front and one side of the cylinder, and showing the paper gripper in its engaged position and the cardboard gripper disengaged.

The cylinder 7 is arranged transversely between the front and rear sides of the frame 1, on the left end thereof as shown in FIGURE 1, and is rigidly connected to a shaft 8. The shaft 8 is journaled at its ends in bearings 9 provided therefor in the adjacent standards 2, above the vertical center line of the frame 1, and is rotatable in a clockwise direction as viewed in FIGURE 1.

A sprocket 10 is rigidly connected to the forward end of the shaft 8 and is rotatable therewith. The sprocket 10 is connected by a chain belt 11 to a sprocket 12. The sprocket 12 is rigidly connected to the forward end of a shaft 13, which is arranged parallel to the shaft 8, and is rotatable therewith. The shaft 13 is journaled at its ends in bearings 14 provided therefor in the adjacent standards 2, and is positioned on the right-hand side of the cylinder 7, as viewed in FIGURE 1. The shaft 13 is rotatable in the same direction as the cylinder 7.

A pulley wheel 15 is rigidly connected to the rearward end of the shaft 13 and is rotatable therewith. The pulley wheel 15 is connected by a belt 16 to a pulley wheel 17. The pulley wheel 17 is rigidly connected to one end of a shaft 18, which is arranged parallel to the shaft 13 and has a pulley wheel 19 rigidly connected to its opposite end. The pulley wheel 19 is connected by a belt 20 to a pulley wheel attached to the shaft of an electric motor 21.

A platform 22 is supported on the side braces 3 of the frame 1. A stack of paper sheets 23 are supported on the end of the platform 22 opposite the cylinder 7. A single paper sheet 24 is supported on the end of the platform 22 adjacent the cylinder 7, and is positioned in close proximity thereto. The paper sheets 23 and 24 may be placed manually in the positions shown.

The platform 22 is positioned on the right-hand side of the cylinder 7, as viewed in FIGURE 1, adjacent its lowermost extremity, and is adapted to support the paper sheet 24 in a substantially horizontal plane while advancing it tangentially in close proximity to the cylinder 7. An automatic paper feed may be substituted for the platform 22 if desired.

A plurality of resilient fingers 25 are arranged longitudinally on a bar 26, which is arranged parallel to the cylinder 7 and supported on the platform 22 in spaced relation thereto. The fingers 25 yieldably engage the upper surface of the paper sheet 24, to flatten it, as it is advanced relative to the cylinder 7.

The cylinder 7 has a circumferential opening 27 therein, coextensive with its length, of from about 30 to about 45 degrees, so that its peripheral surface is discontinuous.

A resilient pad 28, which may be smaller than the peripheral surface of the cylinder 7 but larger than the sheets of paper and cardboard which are to be bonded together, is attached to the peripheral surface of the cylinder 7. The pad 28 advantageously may be made of cork, for example.

The leading edge of the pad 28 is positioned rearwardly of the opening 27, relative to the direction of rotation of the cylinder 7, and coincides with the leading edge of the peripheral surface thereof.

A shaft 29 extends longitudinally through the cylinder 7 and is positioned eccentrically thereof, adjacent the circumferential opening 27, in spaced, parallel relation to the shaft 8. The shaft 29 is journaled at its ends in the ends of the cylinder 7.

A plurality of annular elements 30, each of which has a flat side 31, surround the shaft 29 and are rigidly secured thereto at longitudinally spaced intervals. A plurality of metal strips 32, which are curved intermediate their ends, are each connected at one end to the flat side 31 of one of the annular elements 30.

The strips 32 are rotatable with the shaft 29 from a retracted position, in which they are inclined away from the leading edge of the pad 28, to an extended position in which they engage the leading edge of the paper sheet 24, whereby the leading edge of the paper sheet 24 is gripped between the outer ends of the strips 32 and the leading edge of the pad 28 and the paper sheet 24 is rotatable with the cylinder 7. This action will be more fully described hereinafter.

A short channel-shaped element 33 is arranged transversely relative to the shaft 29, and is rigidly connected intermediate its ends to the forward end thereof, exteriorly of the cylinder 7, with its side flanges facing forwardly.

A rod 34, which extends transversely across the forward end of the cylinder 7, eccentrically thereof, is pivotally connected at one end to an end portion of one of the side flanges of the channel-shaped element 33, and has its opposite end loosely inserted through an opening provided therefor in a lug 35, which extends forwardly from the adjacent end of the cylinder 7.

A collar 36 surrounds the rod 34, and is rigidly and adjustably connected to an intermediate portion thereof. A compression spring 37 surrounds the rod 34, and is positioned between the lug 35 and the collar 36. A nut 38 is applied to one end of the rod 34, on the side of the lug 35 opposite the spring 37.

The shaft 29 is rotatable axially substantially 90 degrees, and the channel-shaped element 33 is capable of being biased in either of its rotative positions, whereby the strips 32 are retained in either their retracted or extended positions, by the action of the spring 37. This biasing will occur because the rod 34 is pivotally mounted to the channel member 33 such that, when the two are at right angles to one another, the axis of the rod 34 is in line with the center of the shaft 29. As soon as the rod 29 rotates in either direction, the flange leg of the channel 33, to which the rod 34 is pivotally attached, revolves about the shaft 29, and the compression spring 37 can then bias the channel member 33 further in that direction.

A pin 39, which is attached to the adjacent standard 2, extends rearwardly for engagement with the channel-shaped element 33 upon rotation of the cylinder 7. As the cylinder 7 is rotated the adjacent end of the pin 39 is received between the side flanges of the channel-shaped element 33 and is moved longitudinally relative thereto, whereby the ends of the channel-shaped element 33 are urged in opposite directions about the shaft 29, the shaft 29 is rotated about its axis, and the strips 32 are rotated from their retracted positions to their extended positions in gripping engagement with the leading edge of the paper sheet 24. This rotation of the element 33 occurs because of the relative positions of the shaft 29 and the pin 39 in a radial direction respecting the axis of rotation of the cylinder 7. That is to say, the distance of the pin 39 from the shaft 8 is somewhat greater than that of the shaft 29 from the shaft 8 so that the pin 39 cannot pass clear through the channel-shaped element 33, but, rather, will cause that element to rotate.

Upon engagement of the strips 32 with the leading edge of the paper sheet 24, the paper sheet 24, being gripped between the strips 32 and the leading edge of the pad 28, is rotated with the cylinder 7.

A glue feed roller 40, which is arranged parallel to the cylinder 7 and is positioned on the left-hand side thereof, adjacent its lowermost extremity, as shown in FIGURE 1, is adapted to apply a thin film of glue to the paper sheet 24 as the paper sheet 24 is rotated with the cylinder 7.

The glue feed roller 40 is mounted on a shaft 41, which is rotatably supported at its ends on the upper rim of a rectangular vat 42. The vat 42 contains glue, in which the roller 40 is partially immersed. The vat 42 is supported on a bracket 43, which is pivotally connected at 44 to the adjacent standards 2 whereby the roller 40 may be adjustably positioned relative to the cylinder 7.

A gear wheel 45, which is rigidly connected to the rearward end of the shaft 41, is driven by a larger gear wheel 46, which is rigidly connected to the adjacent end of the shaft 8. A gear wheel 47, which is rigidly connected to the forward end of the shaft 41, drives a smaller gear 48, which is rigidly connected to the adjacent end of a shaft 49.

A roller 50, which is of smaller diameter than the roller 40, is mounted on the shaft 49. The shaft 49 is arranged in closely spaced parallel relation to the shaft 41, and is rotatably supported at its ends on the upper rim of the vat 42. The roller 50 advantageously may be adjustably spaced relative to the roller 40, whereby the thickness of the glue film applied to the paper sheet 24 may be adjusted.

A sub-frame, designated generally by the numeral 51, is positioned above the cylinder 7. The sub-frame includes a pair of end members 52 and 53, which are rigidly connected to the ends of a pair of elongated round bars 54 and 55. The bars 54 and 55 are disposed horizontally in parallel, spaced relation to each other, and are arranged parallel to the cylinder 7, on opposite sides of the shaft 8. The bar 54 is rigidly connected at its ends to the upper ends of the adjacent standards 2, and the bar 55 is rigidly connected at its ends to the upper ends of a pair of inclined braces 56, which are secured to the frame 1 and extend outwardly beyond the adjacent end thereof.

A platform 57, which is shown fragmentarily, is supported at one end by brackets 58 attached to the sub-frame 51. A stack of cardboard sheets 59, which are also shown fragmentarily, are supported on the end of the platform 57 opposite the cylinder 7. A single cardboard sheet 60 is supported on the end of the platform 57 adjacent the cylinder 7, and is positioned in close proximity thereto. The cardboard sheets 59 and 60 may be placed manually in the positions shown.

The platform 57 is positioned on the left-hand side of the cylinder 7, relative to its direction of rotation, adjacent its uppermost extremity, and is adapted to support the cardboard sheet 60 in a substantially horizontal plane while advancing it tangentially in close proximity to the cylinder 7. An automatic cardboard feed may be substituted for the platform 57 if desired.

A plurality of gear wheels 61, each of which has a flattened surface 62 on one side thereof intermediate its ends, flanked by toothed end portions 63, surround the shaft 29 and are journaled in bearings 64 provided therefor on the shaft 29 at longitudinally spaced intervals, between the annular elements 30. A plurality of metal strips 65, which are curved intermediate their ends, are each connected at one end to the flattened surface 62 of one of the gear wheels 61.

A shaft 66 extends longitudinally through the cylinder 7 and is positioned eccentrically thereof, adjacent the circumferential opening 27, in spaced, parallel relation to the shaft 29. The shaft 66 is journaled at its ends in the ends of the cylinder 7.

A plurality of gear wheels 67 surround the shaft 66 and are rigidly secured thereto at longitudinally spaced intervals corresponding to the spacing of the gear wheels 61. The gear wheels 67 are positioned opposite the respective gear wheels 61, and mesh therewith, whereby the gear wheels 61 are driven by the shaft 66.

The strips 65 are rotatable about the shaft 29, upon rotation of the shaft 66, from a retracted position, in which they are inclined away from the leading edge of the pad 28, to an extended position in which they engage the leading edge of the cardboard sheet 60, whereby the leading edge of the cardboard sheet 60 is gripped between the outer ends of the strips 65 and the leading edge of the pad 28 and the cardboard sheet 60 is rotatable with the cylinder 7 in juxtaposed relation to the paper sheet 24.

A short channel-shaped element 68, similar to the element 33, is arranged transversely relative to the shaft 66, and is rigidly connected intermediate its ends to the rearward end thereof, exteriorly of the cylinder 7, with its side flanges facing rearwardly.

A rod 69, which extends transversely across the rearward end of the cylinder 7, eccentrically thereof, is pivotally connected at one end to an end portion of one of the side flanges of the channel-shaped element 68, and has its opposite end loosely inserted through an opening provided therefor in a lug 70, which extends rearwardly from the adjacent end of the cylinder 7.

A collar 71 surrounds the rod 69, and is rigidly and adjustably connected to an intermediate portion thereof. A compression spring 72 surrounds the rod 69, and is positioned between the lug 70 and the collar 71. A nut 73 is applied to one end of the rod 69, on the side of the lug 70 opposite the spring 72.

The shaft 66 is rotatable axially substantially 90 degrees, and the channel-shaped element 68 is capable of being biased in either of its rotative positions, whereby the strips 65 are retained in either their retracted or extended positions, by the action of the spring 72. This action is similar to that already described in more detail respecting the biasing of the channel member 33.

A pin 74, which is attached to the adjacent standard 2, extends forwardly for engagement with the channel-shaped element 68 upon rotation of the cylinder 7. As the cylinder 7 is rotated the adjacent end of the pin 74 is received between the side flanges of the channel-shaped element 68 and is moved longitudinally relative thereto, whereby the ends of the channel-shaped element 68 are urged in opposite directions about the shaft 66, the shaft 66 is rotated about its axis, and the strips 65 are rotated from their retracted positions to their extended positions in gripping engagement with the leading edge of the cardboard sheet 60.

Upon engagement of the strips 65 with the leading edge of the cardboard sheet 60, the cardboard sheet 60 is rotated with the cylinder 7 in juxtaposed relation to the paper sheet 24.

A pressure roller 75 is mounted on a shaft 76, which is positioned above the cylinder 7 and is arranged parallel thereto, between the bars 54 and 55. The shaft 76 is journaled at its ends in bearings (not shown), each of which is suspended from a yoke 77. The yokes 77 are each rigidly connected to the lower end of a vertically disposed rod 78. The rods 78 are each passed upwardly through an opening provided therefor in the top of a U-shaped support 79, the legs of which are connected to one of the end members 52, 53, and which comprises an upward extension thereof. The rods 78 are threaded for engagement by nuts 80 and lock nuts 81, which are positioned above the respective supports 79, whereby the rods 78 are suspended from the supports 79. Compression springs 82 surround the respective rods 78, and are each positioned between one of the yokes 77 and the corresponding support 79.

The pressure roller 75 coacts with the cylinder 7 to press the juxtaposed paper sheet 24 and cardboard sheet 60 together. The pressure roller 75 is yieldably and adjustably supported as above described, and the tension applied to the pressure roller 75 may be adjusted by manipulating the nuts 80 and the lock nuts 81.

A pair of cams 83 are attached to the ends of the cylinder 7, adjacent the circumferential opening 27, and extend radially outwardly beyond the circumference thereof. Upon rotation of the cylinder 7 the cams 83 engage a pair of followers 84, which rotatably surround the shaft 76 to thereby raise the pressure roller 75, and disengage it from the cylinder 7, for a time interval sufficient to permit free operation of the cardboard gripping means, including the strips 65, whereby the strips 65 engage the leading edge of the cardboard sheet 60, and to permit the paper and cardboard gripping means, including the strips 32 and 65, and the leading edges of the juxtaposed paper sheet 24 and cardboard sheet 60, to be passed below the pressure roller 75.

A horizontally disposed round bar 85 is arranged in parallel, spaced relation to the bar 55, on the left-hand side thereof as shown in FIGURE 1, and is rigidly connected at its ends to brackets 86, which are attached to the end members 52 and 53, respectively. A plurality of resilient strips 87 are spaced longitudinally relative to the bar 85, and are each connected at one end to the bar 85, by a screw 88, and depend therefrom. The strips 87 are curved intermediate their ends, and yieldably engage the leading edge of the cardboard sheet 60, whereby it is flattened, as it is advanced in close proximity to the cylinder 7.

A sleeve 89 surrounds the bar 54 and is rotatable relative thereto. A pair of detent elements, indicated generally by the numeral 90, are attached to the sleeve 89 in spaced apart relation to each other, as hereinafter described, and are rotatable therewith. The detent elements 90, which are responsive to the rotative position of the cylinder 7, as hereinafter described, restrain the cardboard sheet 60 against advancement relative to the cylinder 7 until the leading edge of the paper sheet 24 is aligned with the leading edge of the cardboard sheet 60, by rotation of the paper sheet 24 with the cylinder 7, and thereafter release the cardboard sheet 60 instantaneously, whereby the cardboard sheet 60 is rotated with the cylinder 7, in juxtaposed relation to the paper sheet 24, in response to the action of the cardboard-gripping means, including the strips 65.

The detent elements 90 each include an upstanding support 91, which is rigidly connected to the sleeve 89 and rotatable therewith. An elongated member 92, which is normally disposed horizontally, is adjustably supported at one end by the upstanding support 91 whereby the elongated member 92 is adjustable longitudinally relative to the upstanding support 91.

The elongated members 92 each extend transversely across the top of the pressure roller 75, in spaced relation thereto. A pair of elongated members 93, which are normally disposed vertically, are rigidly connected at their upper ends to the respective elongated members 92, and depend therefrom. The elongated members 93 extend downwardly between the cylinder 7 and the bar 55, and normally engage the leading edge of the cardboard sheet 60 to restrain the cardboard sheet 60 against advancement relative to the cylinder 7, as above described.

A collar 94 is attached to the forward end of the sleeve 89 and is rotatable therewith. A collar 95, which is positioned between the collar 94 and the adjacent end member 52, surrounds the bar 54 and is rotatable relative thereto independently of the sleeve 89. The collars 94 and 95 have peripheral flanges, numbered 96 and 97, respectively, which extend radially outwardly therefrom.

Figure 12:
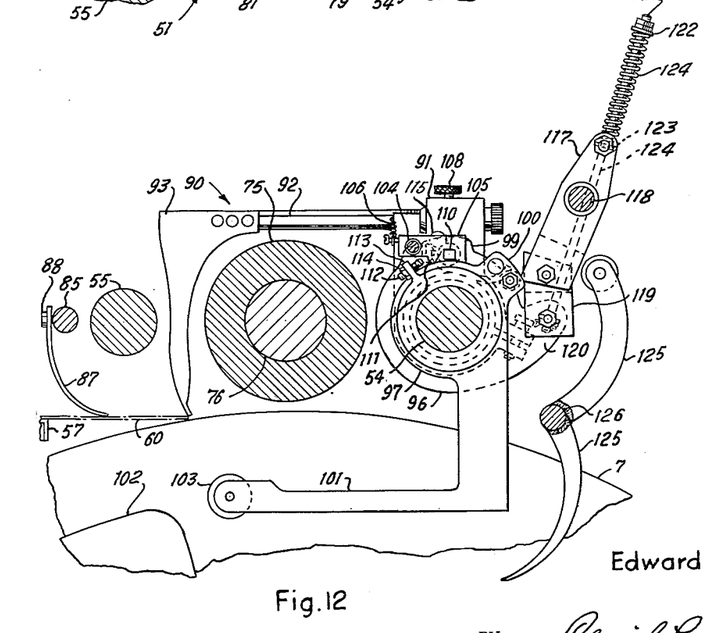
FIGURE 12 is a fragmentary sectional elevational view taken on the lines 12—12 of FIGURE 11.

A torsion spring 98 surrounds the collar 94 and is connected at its ends to radial extensions 99 and 100 of the flanges 96 and 97, respectively, so that upon rotation of the collar 95 torque is applied to the collar 94 through the spring 98. Upon rotating the collar 95 in a clockwise direction, as shown in FIGURE 12, while restraining the collar 94 against rotation, as hereinafter described, the spring 98 is elongated whereby its tension is increased.

A lever 101, which is formed integrally with the flange 97, is bent substantially at right angles intermediate its ends and has a normally vertically disposed end portion which depends from the flange 97 and a normally horizontally disposed end portion which extends across the forward end of the cylinder 7 adjacent its uppermost extremity. A cam 102 is attached to the forward end of the cylinder 7, adjacent the circumferential opening 27, for engagement by a roller 103 on the lower end of the lever 101, whereby the lower end of the lever 101 is raised and the collar 95 is rotated in a clockwise direction.

A horizontally disposed pin 104 is attached to the end member 52 and extends rearwardly therefrom. A latch member 105 is pivotally connected adjacent one of its ends to the pin 104. The latch member 105 is biased by a tension spring 106, which is connected at one end to the end member 52, whereby the latch member 105 is yieldably urged in a clockwise direction about the pin 104.

Figure 11:
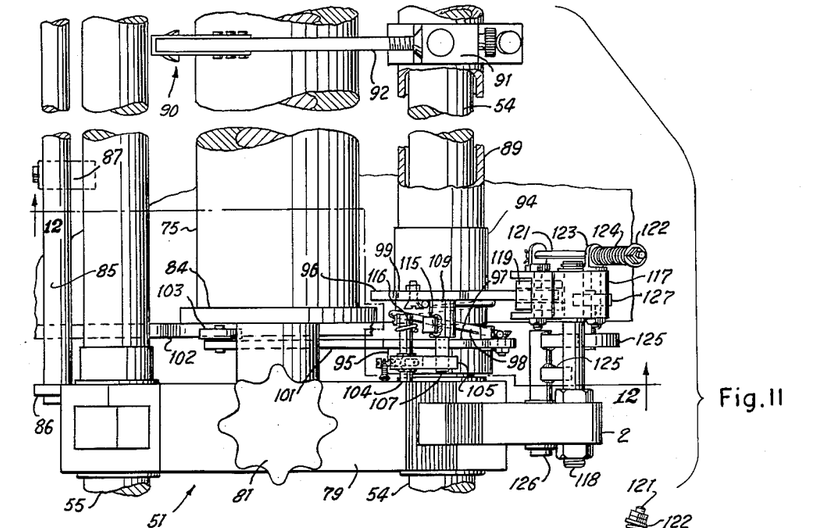
FIGURE 11 is a fragmentary top plan view, on an enlarged scale, showing a portion of the apparatus.

The pin 104 extends transversely across the peripheral surfaces of the collar 95 and the flange 97, and its free end is positioned above the collar 94. A horizontally disposed pin 107 is rigidly connected at one end to the flange 96 and extends forwardly therefrom. The pin 107 is arranged in parallel, spaced relation to the pin 104, and is positioned on the right-hand side thereof, as shown in FIGURE 11.

The pin 107 extends transversely across the peripheral surfaces of the collars 94 and 95 and the flange 97, and its free end engages a notch 108 formed in the under side of the latch member 105. The pin 107 has an enlarged end portion 109 positioned rearwardly of the flange 97, and a square end portion 110 for engagement with the notch 108.

The notch 108 has straight top and side edges for engagement with adjacent sides of the square end portion 110 of the pin 107. The side edge of the notch 108 nearest the pin 104 is inclined downwardly and outwardly for free movement of the latch 105 relative to the pin 107 once the latch is cammed away as will appear.

Upon engagement of the latch member 105 with the pin 107, the collar 94 is restrained against rotation, whereby the tension of the spring 98 is increased upon rotation of the lever 101 and the collar 95 about the bar 54. Upon releasing the latch member 105, as hereinafter described the collar 94 is rotated instantly, in a clockwise direction, by the applied torque.

The latch member 105 has a downward projection 111 on its under side, between the pin 104 and the notch 105. A set screw 112, which is inserted through a threaded opening provided therefor in a lug 113 connected to the collar 95 and extending radially outwardly therefrom, forwardly of the flange 97, and has a lock nut 114 threaded thereon, is adapted to engage the projection 111, upon rotation of the lever 101 and the collar 95 about the bar 54, to thereby disengage the latch member 105 from the pin 107.

A bumper 115 is attached to the enlarged end portion 109 of the pin 107, eccentrically thereof, whereby the pin 107 is predisposed to be rotated in a counter clockwise direction, as the latch member 105 is raised, to permit the pin 107 to be disengaged from the notch 108. A coil spring 116, which surrounds the pin 104 adjacent its free end and is connected thereto at one end and has its other end disposed upwardly in a cantilever fashion within the path of counterclockwise revolution of the bumper 115. Thus is the return rotation of the collar 94, to which the bumper 115 is attached, cushioned against excessive counterclockwise rotation. Of course, the approach of the lower end of the projection 93 toward the cylinder 7 defines the extreme counterclockwise rotational limit of the collar 94.

A toggle link 117 is pivotally connected intermediate its ends to a horizontally disposed pin 118, which is rigidly connected to an upward extension of the adjacent standard 2, on the right hand side of the end member 52, and extends rearwardly therefrom. The pin 118 is arranged in spaced, parallel relation to the bar 54, and is positioned on the right hand side thereof, at a somewhat higher elevation, as shown in FIGURE 12.

The toggle link 117 has a bifurcated lower end, which is pivotally connected to the upper end of a toggle link 119. The toggle link 119 has a bifurcated lower end which is pivotally connected to an ear 120 and to the lower end of a rod 121. The ear 120 comprises a radial extension of the flange 96. The rod 121 has a spring seat 122 on its upper end, and a spring seat 123, which is pivotally connected to the upper end of the toggle link 117, has an opening therein loosely surrounding the rod 121 intermediate its ends. A compression spring 124 surrounds the upper end portion of the rod 121 and is positioned between the spring seats 122 and 123.

Upon rotation of the collar 94 in a clockwise direction, as shown in FIGURE 12, the toggle links 117 and 119 are extended to and beyond in a straight line position, by the action and inertia of the ear 120 on the toggle link 119, and are retained in that position by the action of the spring 124 (see FIGURE 12), whereby the detent elements 90, which are rotatable with the sleeve 89 and the collar 94, are secured in their released positions relative to the cardboard sheet 60.

A lever 125 is rigidly connected intermediate its ends to a pin 126, which is arranged in spaced parallel relation to the pin 118, at a somewhat lower elevation. The pin 126 is pivotally connected to the adjacent standard 2 and extends rearwardly therefrom. The lever 125 has a roller 127 on its upper end for abutment against the connected ends of the toggle links 117 and 119, whereby the toggle links 117 and 119 are moved out of a straight line position relative to each other, to thereby reset the detent elements 90. A pin 128 is attached to the forward end of the cylinder 7, eccentrically thereof, for engagement with the lower end of the lever 125 to rotate it about the pin 126, upon rotation of the cylinder 7.

Pins 129 and 130 are attached to opposite ends of the cylinder 7, eccentrically thereof, for engagement by the channel-shaped elements 33 and 68, respectively, upon rotation of the cylinder 7, to thereby release the paper and cardboard-gripping means, respectively, as the composite paper and cardboard sheet 24, 60 is advanced beyond the pressure roller 75.

The action of the pins 129 and 130 on the channel-shaped elements 33 and 68, respectively, is similar to that of the pins 39 and 74, respectively. The shafts 29 and 66 are rotated, by the action of the pins 129 and 130 on the channel-shaped elements 33 and 68, respectively, in a direction which is opposite the direction in which the shafts 29 and 66 are rotated by the action of the pins 39 and 74 on the channel-shaped elements 33 and 68, respectively, to thereby release the paper and cardboard-gripping means simultaneously.

A plurality of conveyor belts 131, which are arranged in side by side relation to each other, are positioned to receive the composite paper and cardboard sheet 24, 60 as it is released by the pressure roller 75.

The conveyor belts 131 are supported in substantially horizontal position on rollers 132, 133 and 134. The roller 132 is mounted on the shaft 13, and is rotatable therewith, whereby the conveyor belts 131 are driven.

The roller 133 is mounted on a shaft 135, which is journaled at its ends in bearings 136 provided therefor in the adjacent standards 2, on the opposite end of the frame 1 from the shaft 13.

The roller 134 is mounted on a shaft 137, which is journaled at its ends in bearings 138 provided therefor in a sub-frame 139, which is pivotally connected to the shaft 135 and has an integral clamp 140 on each side thereof whereby it is adjustably positioned relative to the adjacent standards 2.

An idler roller 141, which engages the under sides of the conveyor belts 131, is mounted on a shaft 142, which is arranged in spaced, parallel relation to the shaft 135, at a somewhat lower elevation, and is journaled at its ends in bearings 143 provided therefor in the adjacent standards 2.

The space between the top side of the cylinder 7 and the top side of the conveyor belts 131 is bridged by a plurality of elements 144, which are longitudinally spaced relative to a supporting bar (not shown).

The invention may be modified in various ways without departing from the spirit and scope thereof.

The operation of the rotary mounter may be summarized as follows: The single motor 21 imparts a driving force to the large cylinder 7 as well as to the glue roller 40 and the conveyor belts 131. Of course, the various gear trains which have already been described are designed to assure the proper relative rates of rotation of the various driven elements.

With the paper sheets 23 and 24 and the cardboard sheets 59 and 60 placed, as illustrated at FIGURE 1, upon their respective shelves 22 and 57 (and the glue vat 42 filled with glue), the machine is ready for a laminating operation.

At the beginning of a laminating operation, the cylinder 7 will have rotated beyond the point at which the channel-shaped member 33 engages the pin 129, but short of the point at which that member engages the pin 39. In this position of the cylinder 7, the paper-gripping fingers 32 and the cardboard gripping fingers 67 will be in their retracted positions away from the leading edge of the pad 28.

Upon further operation of the cylinder 7, the channel-shaped member 32 is rotated by the pin 39, and the fingers 32 are snapped against the pad 28 by the action of the compression spring 37. Because of the location of the pin 39 relative to the shelf 22, the sheet 24 will be gripped between the fingers 32 and the pad 28. It will be carried with the drum 7, flat against the pad 28, until released from the grip of the fingers 32.

As the cylinder 7 continues to rotate, the paper sheet 24 passes the glue roller 40 which applies a thin coat of glue as regulated by the roller 50. Because of the spacing of the pad 28 from the cylinder 7 and because the paper sheet 24 is substantially the same size as the pad 28, all excess glue will be squirted, not upon the pad 28, but upon the cylinder 7. Also, the glue roller 40, although close to the pad 28, is spaced from the cylinder 7, so that it does not apply glue before and after the paper sheet 24 has passed. Thus the succeeding sheets 23, when placed upon the pad 28, will not be stuck thereto by extra glue.

The resilient fingers 87 cause the leading edge of the cardboard sheet 60 to be flattened as it approaches the cylinder 7. The elongated members 93 restrain the cardboard sheet 60 against advancement relative to the cylinder 7 as might be caused by friction of the surfaces of the cylinder 7 until the elongated elements 93 are raised by rotation of the sleeve 89 about the shaft 54. This rotation of the sleeve 89 is accurately timed with respect to the rotative position of the leading edge of the paper sheet 24 by the camming surface 102 as it reaches the follower 103. The projections 93 also serve to position the cardboard sheet 60 for gripping by the fingers 65.

Continued rotation of the cylinder 7 will press the camming surfaces 83 against the pressure roller 75 and the camming surface 102 against the follower 103. This will occur just prior to the interception of the channel-shaped member 68 by the pin 74 and will cause the pressure roller 75 to be raised above the cylinder 7 to provide clearance for the snapping path of the fingers 65. The camming surface will cause the projections 93 to be raised from their positions blocking the passage of the cardboard sheet 60 toward the cylinder 7. The fingers 65, when rotated by the co-action of the channel-shaped member 68 with the pin 74, will grip the cardboard sheet 60 between them and the leading edge of the pad 28. Thus, both the paper sheet 24 and the cardboard sheet 60 will have the leading edges aligned adjacent the leading edge of the pad 28.

The paper sheet 24 and the cardboard sheet 60 are pressed together between the pressure roller 75 and the pad 28, as they pass therebetween. When the channel-shaped members 33 and 68 reach the pins 129 and 130, respectively, they are again rotated to release the paper and cardboard sheets for passage away from the machine.

After only a slight degree of rotation, the cylinder 7 is in position to perform a similar laminating operation.

What is claimed is:

1. A machine for laminating together a pair of paper sheets or the like comprising a movable member having a basic surface, a glue source, means providing a first approach position for one sheet of said pair, means providing a second approach position for the other sheet, and a pressure applying member having a pressure applying surface; means for moving said movable member so that the basic surface moves past said approach positions, said glue source and said pressure surface of the pressure applying member; first means for clamping said one sheet to said basic surface and for carrying it with said basic surface past said glue source and said other sheet; means for actuating the clamping means in response to movement of the movable member to a predetermined position relative to the first approach position, second means for clamping said other sheet against said surface in juxtaposed relation to the one sheet with the leading edges of the sheets adjacent one another, the first and second clamping means holding the sheets in position for being pressed between said basic surface and said pressure applying surface when the movable means moves the movable member past the pressure applying member; and means controlled by the position of the movable member for thereafter releasing the composite sheets.

2. The machine of claim 1 including means controlled by the movement of the movable member for restraining the admittance against said basic surface of said other sheet prior to the correspondence of its leading edge with the leading edge of said one sheet; and means for withdrawing said restraining means at least by the time that correspondence occurs.

3. The machine of claim 1 including a pad attached to said basic surface for spacing said sheets from said surface.

4. The machine of claim 3 wherein said second clamping means comprises a plurality of fingers movable toward and away from the leading edge of said pad; and means for moving said fingers toward said leading edge at least by the time the leading edge of the one sheet corresponds in position to the leading edge of the other sheet, and away from said pad after the leading edges of said sheets have been carried with said basic surface by the movable member past said pressure surface.

5. The machine of claim 4 wherein said first clamping means comprises a plurality of fingers movable toward and away from the leading edge of said pad; and means for moving said fingers toward said pad when the leading edge of the pad reaches the leading edge of said one sheet, and away from said pad after the leading edges of said sheets have been carried by said basic surface past said pressure surface.

6. The machine of claim 5 including means for conveying the laminated sheets away from the basic surface after they have been released by the clamping means.

7. A machine for laminating together a pair of paper sheets or the like comprising a rotary drum having a cylindrical surface; a recess in a portion of said surface; first and second sheet supply means spaced from one another about the periphery of the drum; first gripping means within the recess, movable toward the trailing edges thereof, for gripping a sheet from said first supply means between said first gripping means and said trailing edge and carrying the sheet upon the surface of said drum; second gripping means within the recess, movable toward the trailing edge thereof, for gripping a sheet from said second supply means between said second gripping means and said trailing edge; and means for pressing the sheets together as they are carried by the drum.

8. A machine for laminating together a pair of paper sheets or the like comprising a rotary cylinder; first and second sheet introducing stations; means for releasably attaching to said cylinder a first sheet from said first station and carrying it with said cylinder; means for applying glue to said first sheet; means between said cylinder and said second station for blocking the introduction of a second sheet to said cylinder; means controlled by the rotative position of said cylinder for withdrawing said blocking means when said first sheet approaches said second sheet; means for releasably attaching said second sheet to said cylinder with the leading edge thereof adjacent the leading edge of the first sheet; said last-mentioned means being controlled by the rotative position of the cylinder to operate after withdrawal of said blocking means.

9. The machine of claim 8 including means controlled by the cylinder for returning said blocking means to blocking position after said second sheet has been carried from said second station by said cylinder.

10. A paper laminating machine comprising a rotary drum, a paper receiving surface on the drum, a first paper supporting platform, a first sheet of paper on the first platform, first paper gripping means movable with and supported by the drum adjacent the leading edge of the paper receiving surface for gripping an edge of the first sheet of paper, the first platform being positioned to allow the first sheet of paper to have a grippable edge in the path of movement of the first paper gripping means, a second paper supporting platform, a second sheet of paper on the second platform, second paper gripping means movable with and supported by the drum adjacent the leading edge of the paper receiving surface for gripping an edge of the second sheet of paper, the second platform being positioned to allow the second sheet of paper to have a grippable edge in the path of movement of the second paper gripping means, the first and second paper gripping means being normally in non-gripping conditions, first actuator means responsive to movement of the first paper gripping means to a position adjacent the grippable edge of the first sheet of paper for causing the first paper gripping means to shift from non-gripping to gripping condition to thereby grip the grippable edge of the first sheet of paper, second actuator means responsive to movement the second sheet of paper for causing the second paper gripping means to shift from non-gripping to gripping condition to thereby grip the grippable edge of the second sheet of paper.

11. The machine of claim 10 including means movable between blocking and unblocking positions for blocking the movement of the grippable edge of the second sheet closer than a predetermined proximity to the drum, means for normally biasing the blocking means into blocking position, and means for withdrawing the blocking means before the second gripping means grips the second sheet.

12. The machine of claim 11 wherein the blocking means comprising at least two detent members spaced from one another, each detent member having an end normally positioned adjacent the surface of the drum along a line parallel to the axis of rotation of the drum, a fixed mounting frame, means for pivotally attaching the detent member to the frame, lever means operatively connected to the detent members for pivoting the detent members to move the ends of the detent members away from the blocking position, cam means rotatable with the drum for causing the lever means to pivot the detent members, and spring means to return the detent members to blocking position after the cam means passes the lever means.

13. The machine of claim 10 including a glue applicator positioned between the first and second paper supporting platforms and in the path of movement of the paper receiving surface.

14. The machine of claim 13 including a pressure roller positioned adjacent the drum and after the second gripping means for pressing the second sheet against the first sheet.

15. The machine of claim 14 including means responsive to the movement of the first and second gripping means to proximity with the pressure roller for increasing the distance between the pressure roller and the drum during passage of the first and second gripping means past the pressure roller.

References Cited in the file of this patent

UNITED STATES PATENTS

| | | |
|---|---|---|
| 2,572,450 | Crissy | Oct. 23, 1951 |
| 2,589,428 | Pearce | Mar. 18, 1952 |
| 2,663,352 | Keller | Dec. 22, 1953 |
| 2,704,107 | Dyment | Mar. 15, 1955 |
| 2,865,287 | Streich et al. | Dec. 23, 1958 |